(12) United States Patent  (10) Patent No.: US 6,675,650 B1
Paulo  (45) Date of Patent: Jan. 13, 2004

(54) AUTOMOTIVE DISPLAY

(75) Inventor: Sergio Alexandre Paulo, Kingsville (CA)

(73) Assignee: Yazaki North America, Canton, MI (US)

( * ) Notice: Subject to any disclaimer, the term of this patent is extended or adjusted under 35 U.S.C. 154(b) by 100 days.

(21) Appl. No.: 10/006,864

(22) Filed: Nov. 12, 2001

(51) Int. Cl.[7] .............................. G01P 3/00; G01P 15/00; G01R 15/00
(52) U.S. Cl. ....................... 73/491; 73/499; 340/815.45; 324/115
(58) Field of Search ........................... 73/491, 494, 495, 73/498, 499, 866.3; 324/166, 115, 114, 96, 99 D, 169, 168, 170; 340/815.45, 815.42, 815.47, 815.78, 525, 461

(56) References Cited

U.S. PATENT DOCUMENTS

| 3,748,533 | A | * | 7/1973 | South ............................. 317/5 |
| 3,855,572 | A | * | 12/1974 | Olson .......................... 340/325 |
| 4,000,465 | A | * | 12/1976 | Sugiyama .................... 324/166 |
| 4,041,692 | A | | 8/1977 | Marshino |
| 4,179,938 | A | * | 12/1979 | Schramm ..................... 73/510 |
| 4,258,317 | A | * | 3/1981 | Dubauskas .................. 324/114 |
| 4,352,062 | A | * | 9/1982 | Nomura et al. ............. 324/169 |
| 4,470,011 | A | | 9/1984 | Masuda |
| 4,814,757 | A | * | 3/1989 | Patterson et al. ........... 340/753 |
| 4,841,902 | A | * | 6/1989 | Gubin ........................ 116/62.4 |
| 5,291,195 | A | | 3/1994 | Gross |
| 5,422,625 | A | | 6/1995 | Sakaemura |
| 5,949,346 | A | | 9/1999 | Suzuki et al. |
| 6,188,376 | B1 | * | 2/2001 | Abbe ........................... 345/82 |

FOREIGN PATENT DOCUMENTS

| DE | 2401502 | * | 5/1975 |
| DE | 20009554 | * | 8/2000 |
| JP | 55-155212 | * | 12/1980 |
| JP | 9-5121 | * | 1/1997 |
| JP | 9-329465 | * | 12/1997 |
| JP | 2001-55149 | * | 2/2001 |

* cited by examiner

Primary Examiner—Helen Kwok
(74) Attorney, Agent, or Firm—Young & Basile P.C.

(57) ABSTRACT

A tachyometric display for automotive engines comprising a display head defining a circular display field. The field comprises a plurality of concentric circular bands having a quiescent state in which all of the bands are of the same illumination level and/or color. An engine speed signal is connected through a logic circuit to change the illumination level and/or color of the bands to show speed increases. A conventional needle type speedometer indicator is combined with the display head and suitable indicia are superimposed on the display field.

9 Claims, 3 Drawing Sheets

AUTOMOTIVE DISPLAY

FIELD OF THE INVENTION

This invention relates to automobile instruments and more particularly to the display of a variable quantity such as engine speed using an illuminated display field which changes in area according to the variable quantity and which requires no rotating pointer or the like.

BACKGROUND OF THE INVENTION

Automotive vehicles are typically equipped with a panel mounted in the driver's field of view and containing multiple instruments for displaying variable quantities such as engine speed, road speed, engine temperature and oil pressure. Tachometers and speedometers are usually the larger of the instruments and are often placed side-by-side in the center of the panel.

Most automotive instruments employ pointers or "needles" which are pivotally or rotatably mounted to travel across a display field having numbers or other indicia arranged in an arcuate or circular pattern.

Particularly in automobiles equipped with automatic transmissions, the need for an exact engine speed reading of the type presented by the traditional tachometer is reduced. Moreover, there is a benefit to be derived from combining two instruments, such as the speedometer and tachometer, into a single display head.

SUMMARY OF THE INVENTION

The present invention provides an instrument for displaying automotive operating variables using an illuminated display field which varies in size in proportion to the monitored variable. Such an instrument requires no needle or pointer and can be readily combined with a second display which does use a pointer or needle, thus saving instrument panel space. The display field may, for example, be a circle or portion thereof the illuminated size of which varies in proportion to a transmitted data signal which, in turn, varies in proportion to the measured quantity. Where the measured quantity is engine speed, the illuminated shape grows in radial size from a minimum size for low engine RPM's to a maximum size for high RPM's to give the operator a visual indication of instantaneous engine speed.

In an illustrative embodiment hereinafter described, the display comprises a plurality of concentric circular bands which are progressively illuminated from a small diameter inner band representing low engine speed to a significantly larger diameter outer band representing higher engine speed. Intermediate bands may be individually illuminated to cause the illuminated area to grow in a step-wise fashion, the sizes of the incremental increases in illuminated area being a function of the desired resolution.

In another illustrative embodiment, the bands are the same color when non-illuminated but differ from one another in color when illuminated so that, for example, the display may grow from a small green band at low engine speed to a significantly larger diameter red outer band representing maximum engine speed. Other colors such as green, yellow and orange may be selected for intermediate bands.

In a still further embodiment, display of engine speed is combined in a single display head with a more traditional speedometer display utilizing a rotating needle in combination with a circular strip bearing numerical indicia of vehicle speed. This composite display may further include one or more digital displays; in the illustrated embodiment the supplemental digital display is for engine speed.

The various features and advantages of the invention will be best understood from a reading from the following specification in which several embodiments of the invention are described.

IN THE DRAWINGS

DETAILED DESCRIPTION OF THE ILLUSTRATIVE EMBODIMENTS

Figure 1:
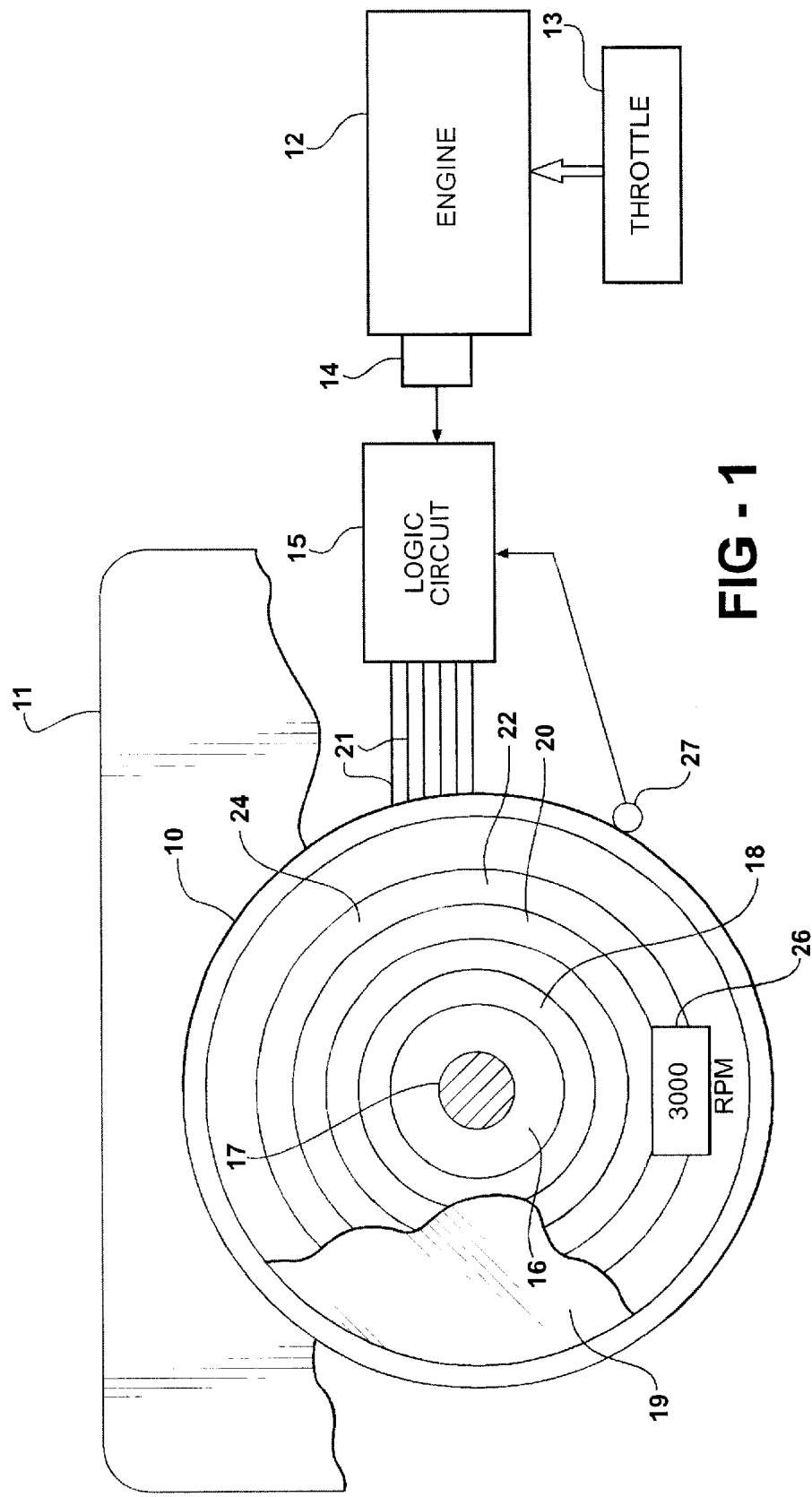
FIG. 1 is a diagram of a system for the display of engine speed using progressively illuminated circular bands on a concentric circular display.

Referring to FIG. 1 there is shown a circular display head 10 conventionally mounted in an automotive instrument panel 11 typically placed in front of the driving position in an automotive vehicle having an internal combustion engine 12. Engine 12 receives throttle commands either mechanically or by wire from a throttle 13 under driver control. The engine is connected to a speed signal transducer 14 such as a flywheel pulse generator to provide a signal to logic circuit 15 providing a sequence of outputs at incrementally increasing levels of speed signal from transducer 14; i.e., each incremental output from circuit 15 represents a different engine RPM. The levels are preferably but not necessarily equally spaced.

The display head 10 is connected to receive the sequence of signals from circuit 15 and to use them to produce a circle of illumination which grows in radial size as engine RPM increases. Display 10 exhibits an opaque center 17 surrounded by concentric bands 16, 18, 20, 22, and 24 of uniformly increasing radial size. In addition, the display head 10 incorporates a digital engine speed indicator 26 in the central lower quadrant thereof.

With no output signal coming from the generator/logic unit 15, the entire area on the face of the display head 10 exclusive of the center 17, is not illuminated and assumes a monochromatic cast according to the color of a semitransparent cover plate 19. The plate 19 may, for example, impart a reddish cast to the display. When the engine 12 is started and the logic circuit 15 produces a first or low level output signal the smallest diameter band 16 is illuminated. The illumination change may be one of brightness; i.e., going from a somber shade to a brighter shade of the same color. Alternatively and preferably, the band 16 is illuminated in dark blue, a strong contrast to the ambient reddish shade of the plate 19. The dark blue band may correspond to 1000 RPM and this number appears in digital form in the display window 26.

As engine speed increases, additional output lines 21 from circuit 15 go "high" to progressively illuminate bands 18, 20, 22, and 24. As a result the size of the illuminated circle increases incrementally from a minimum radial size corresponding to 1000 RPM to a maximum radial size corresponding, for example, to 6000 RPM. As previously indicated, the display may be monochromatic and vary only in illumination level. Alternatively, each of the bands may exhibit a color, which contrasts with the ambient or quiescent shade of the red cover plate 19. By way of example, band 18 is light blue, band 20 is dark green, band 22 is yellow and band 24 is orange. A control 27 is provided for varying the intensity of the illumination within the display head 10 according to the driver's preference and/or day and night time conditions.

The optional digital display 26 provides an exact indication of engine speed, again the resolution or accuracy thereof being a matter of the designers preference.

Figure 2:
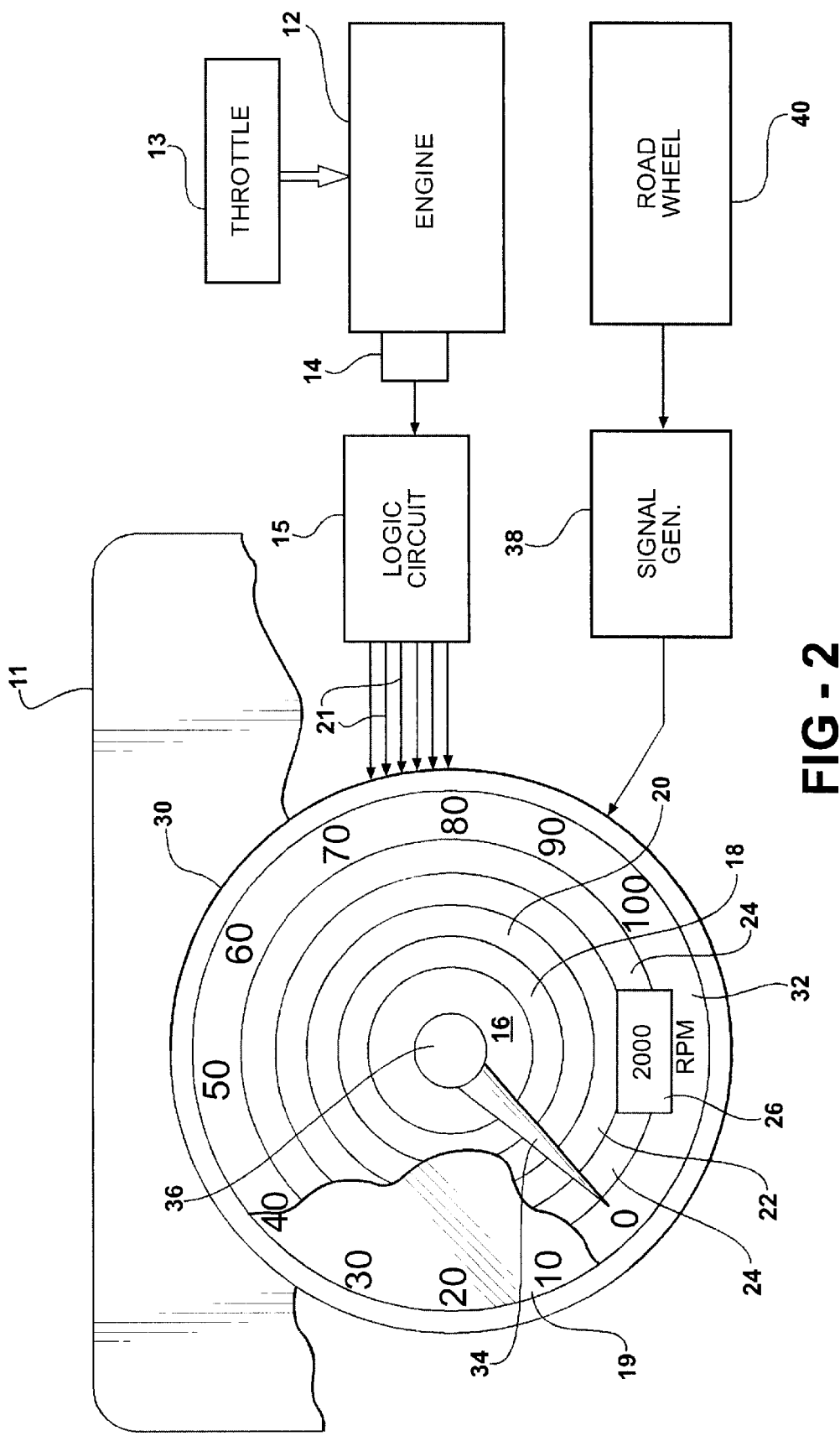
FIG. 2 is a diagram of a system for the display for both engine speed and vehicle speed on a single display head.

Looking now to FIG. 2, a second circular display head 30 is provided with an opaque center 36 and a series of individually illuminable concentric circular display bands 16, 18, 20, 22, and 24 identical to those of the device 10 of FIG. 1 to provide an intuitive indication of the speed of automotive engine 12. Again the engine speed is controlled by throttle 13. A transducer 14 such as a flywheel pulse generator is connected to a logic circuit providing pulse frequency level signals on output lines 21; i.e., as the rate of received pulses increases, the number of "high" outputs 21 increases in regular increments. In the case of FIG. 2, the outer most band 32 of the display cover 19 is provided with a circular array of vehicle speed indicia varying from zero miles per hour to 100 miles per hour. A needle or pointer 34 mounted on the opaque hub 36 sweeps around the display area according to vehicle speed. A vehicle speed signal is provided by connecting a road wheel 40 to an appropriate signal generator 38 which causes circular travel of the needle 34 in a conventional fashion; i.e., magnetic drag cups are commonly used for this purpose. The display head 30 also has a digital display 26 such as that illustrated in FIG. 1.

By combining a speedometer and tachometer display in a single display head, space is conserved in the instrument panel area without loss of data. In fact the combination illustrated in FIG. 2 permits the operator of the vehicle to effectively derive twice as much information from a single observation of the instrument panel without the need to shift his or her eyes and refocus.

Figure 3:
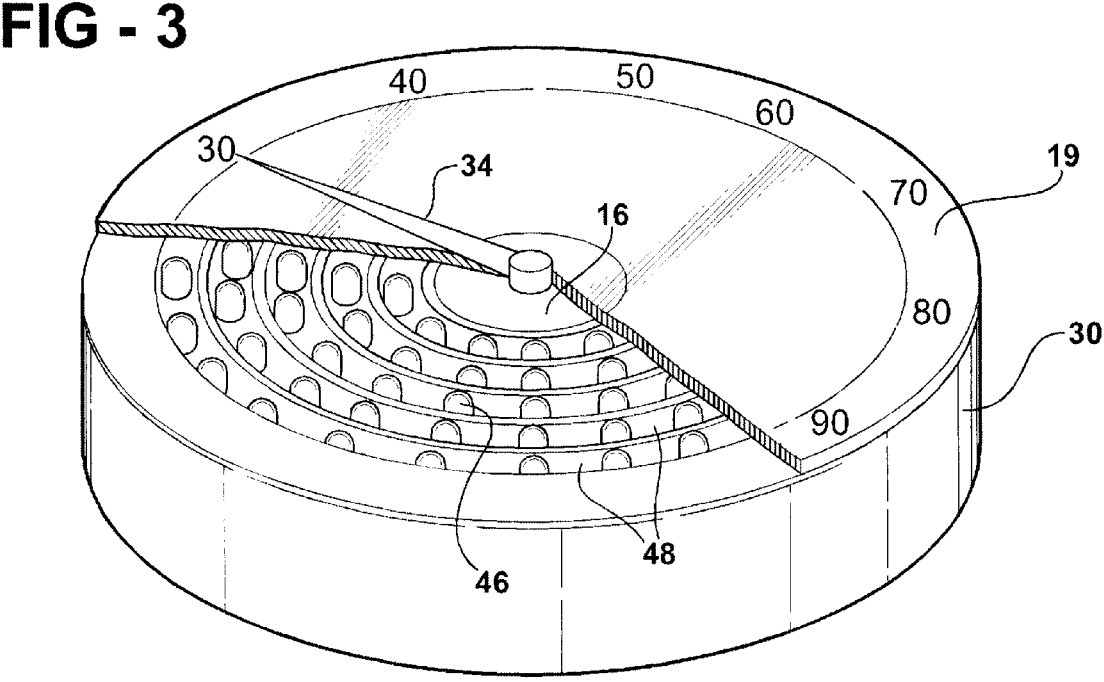
FIG. 3 is a detailed drawing of a particular display head using colored bands of LEDs for illumination purposes.

Referring now to FIG. 3 one illustrative construction of the device 30 of FIG. 2 is shown. The display head 30 is circular and is covered by a translucent plastic cover plate 19 having speed indicia silk screened or otherwise printed around the face near the periphery. Annular groups of colored LEDS 46 mounted on a circuit board (not shown) are arranged to correspond with the bands 18, 20, 22 and 24 of the head 30 shown in FIG. 2. The LEDS 46 are separated by reflective annular plastic partitions 48 which isolate the bands visually and prevent color crossover between the bands. The axle for needle 34 extends through the plate 19.

The display head 10,30 may be implemented other than as discussed above. Examples of displays which can vary in size according to a measured quantity include CRT, liquid crystal displays and plasma displays.

The geometric shapes used to create the illuminated display area do not have to be concentric circles. Other geometric shapes such as semi-circles, ovals, or even rectangles can be utilized for the illuminated display 10. The only geometric shapes to be avoided are ones that create ambiguity with respect to their size increase or that require the operator to use more than simple intuitive deduction to determine the approximate magnitude of the vehicle data of interest.

What is claimed is:

1. An automotive instrument system comprising:
    a signal generator for generating a signal quantity which varies according to changes in a first measured automotive operating quantity;
    a display including a plurality of concentric annular display hands bands of differing radius each corresponding to a progressively greater level of the first measured automotive operating quantity;
    said signal quantity being applied to said display to progressively and cumulatively illuminate the bands from an innermost band outwardly as said signal quantity increases; such that the display varies in illuminated size uniformly and proportionally to the first measured automotive operating quantity alone.

2. An automotive instrument system as defined in claim 1 wherein each of said bands when illuminated is of a distinct color relative to the other bands.

3. An automotive instrument system as defined in claim 1 wherein the measured automotive operating quantity is engine speed.

4. For use in an automobile having a throttle controlled engine capable of running at different speeds:
    a signal generator for generating an electrical signal which varies according to engine speed;
    a display head including a plurality of concentric, continuous circular display bands of differing radius each having at least two different illumination levels corresponding to a progressively greater engine speed;
    said electrical signal being applied to said display so as to progressively and cumulatively illuminate respective bands from an innermost band outwardly as an indication of increasing speed of said engine.

5. A system as defined in claim 4 wherein each of said concentric circular bands when illuminated is of a color which is distinct relative to the color of the other bands, said system further including annular groups of lights corresponding to said bands, and partitions separating the groups.

6. A system as defined in claim 4 further including a source of vehicle road speed signals;
    a rotatable speedometer needle mounted on said display and rotatable about a point coextensive with the center of said concentric circular display bands; and
    means for applying said road speed signals to said needle to cause rotation of said needle according to vehicle road speed.

7. A combined tachometer and speedometer display comprising:
    a generally circular tachometer display field having a center and a plurality of concentric circular display bands of different radius disposed about said center;
    means for changing an illumination level of said display bands in response to a tachometer input signal so as to progressively and cumulatively illuminate respective bands from an innermost band outwardly as an indication of increasing speed of said engine;
    a needle mounted for rotation about said center;
    a vehicle speed signal connected to rotate said needle; and
    indicia disposed about a perimeter of the display field in association with a rotational sweep of an end of the needle to indicate vehicle speed.

8. A display as defined claim 7 wherein at least one illumination level of each of said concentric bands is of a distinct color relative to the color of all other display bands.

9. A display as defined in claim 7 further including a digital tachyometric display mounted within said circular field.

* * * * *